May 16, 1961  S. L. BALLARD  2,984,284
FLEXIBLE MANDREL FOR USE IN COLD BENDING PIPE
Filed Feb. 21, 1956  5 Sheets-Sheet 1
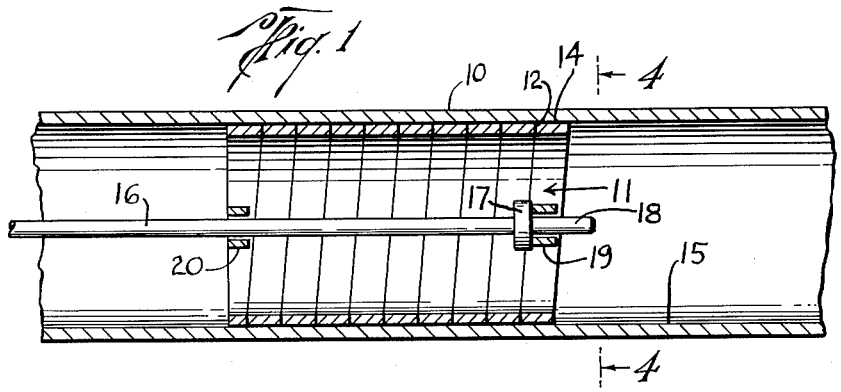
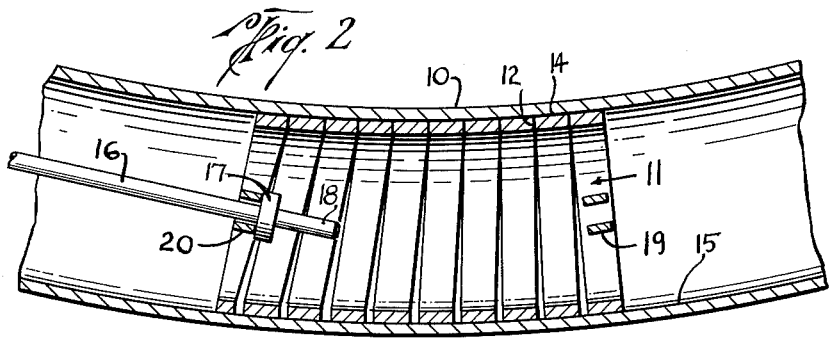
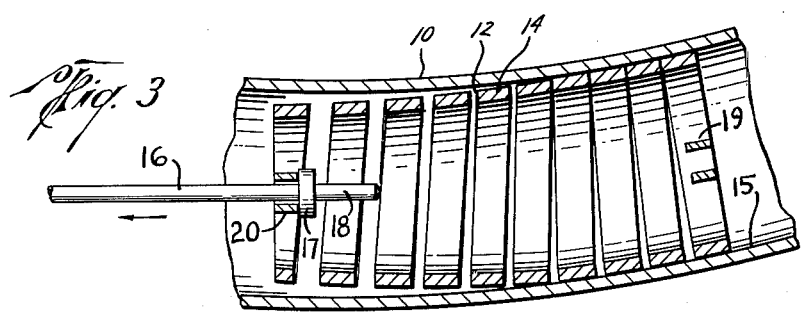
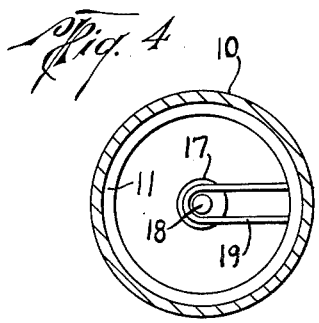
Sam L. Ballard
INVENTOR.
BY Wm. E. Ford
ATTORNEY

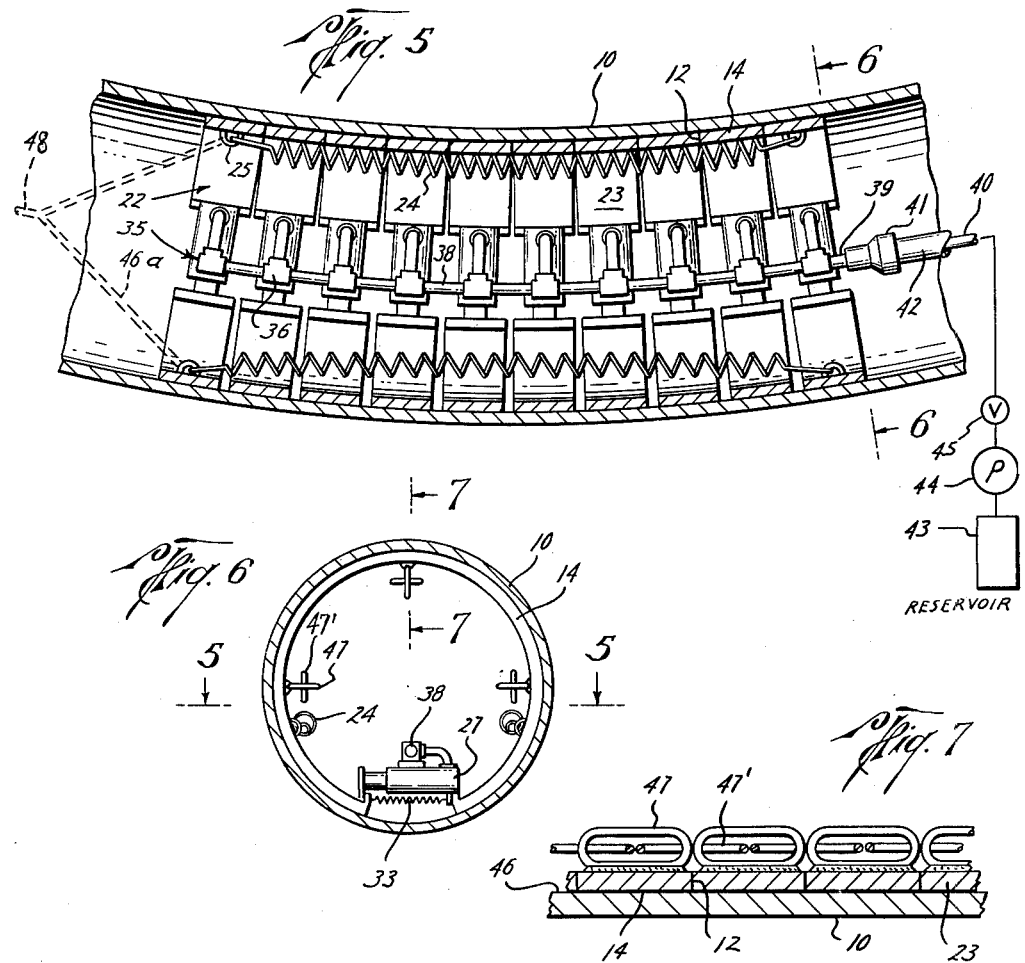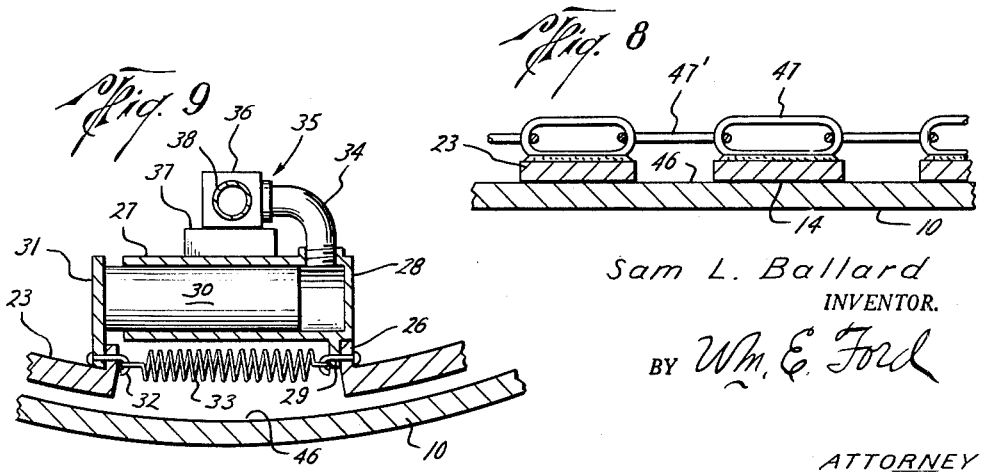

May 16, 1961 S. L. BALLARD 2,984,284
FLEXIBLE MANDREL FOR USE IN COLD BENDING PIPE
Filed Feb. 21, 1956 5 Sheets-Sheet 3
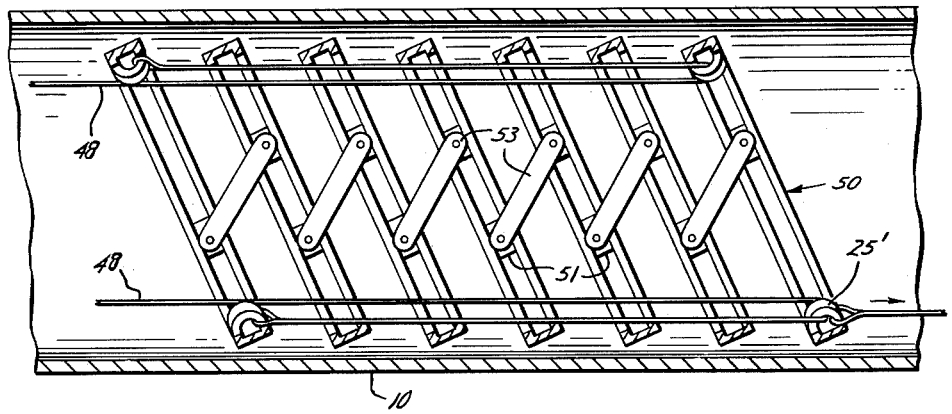
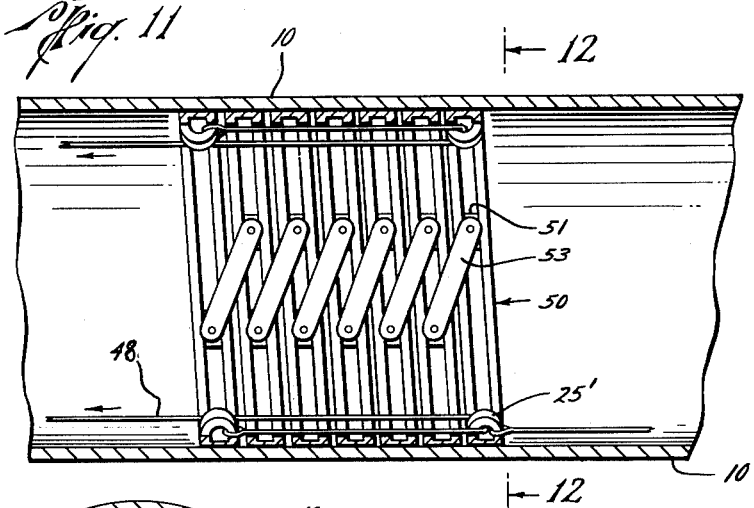
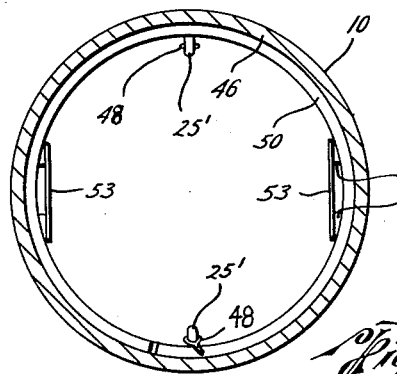
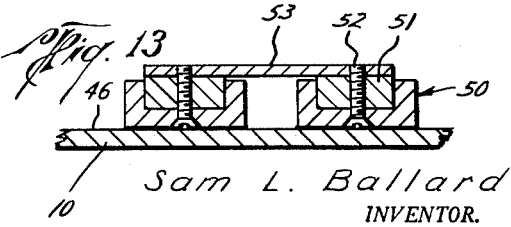
Sam L. Ballard
INVENTOR.
BY Wm. E. Ford
ATTORNEY

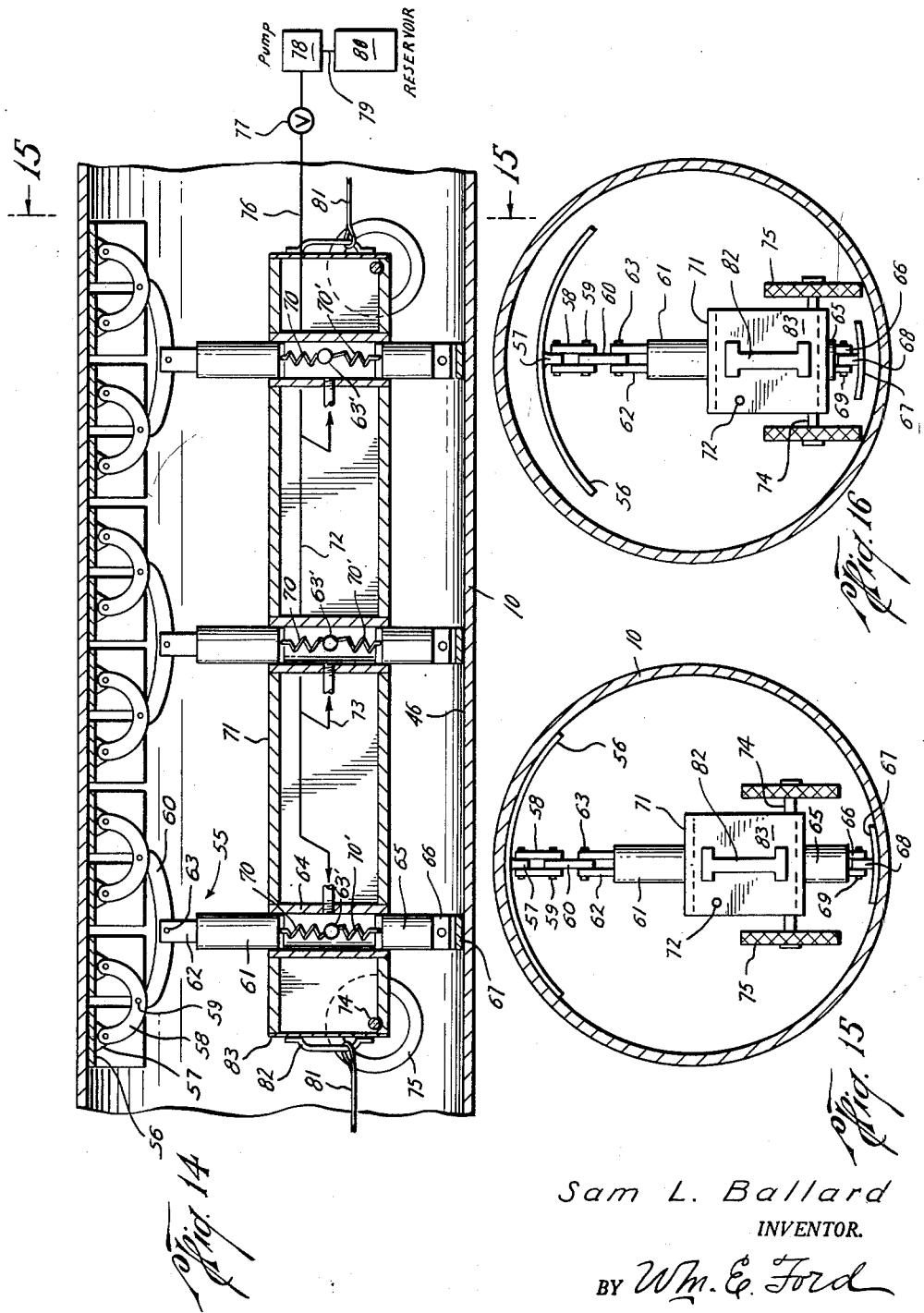

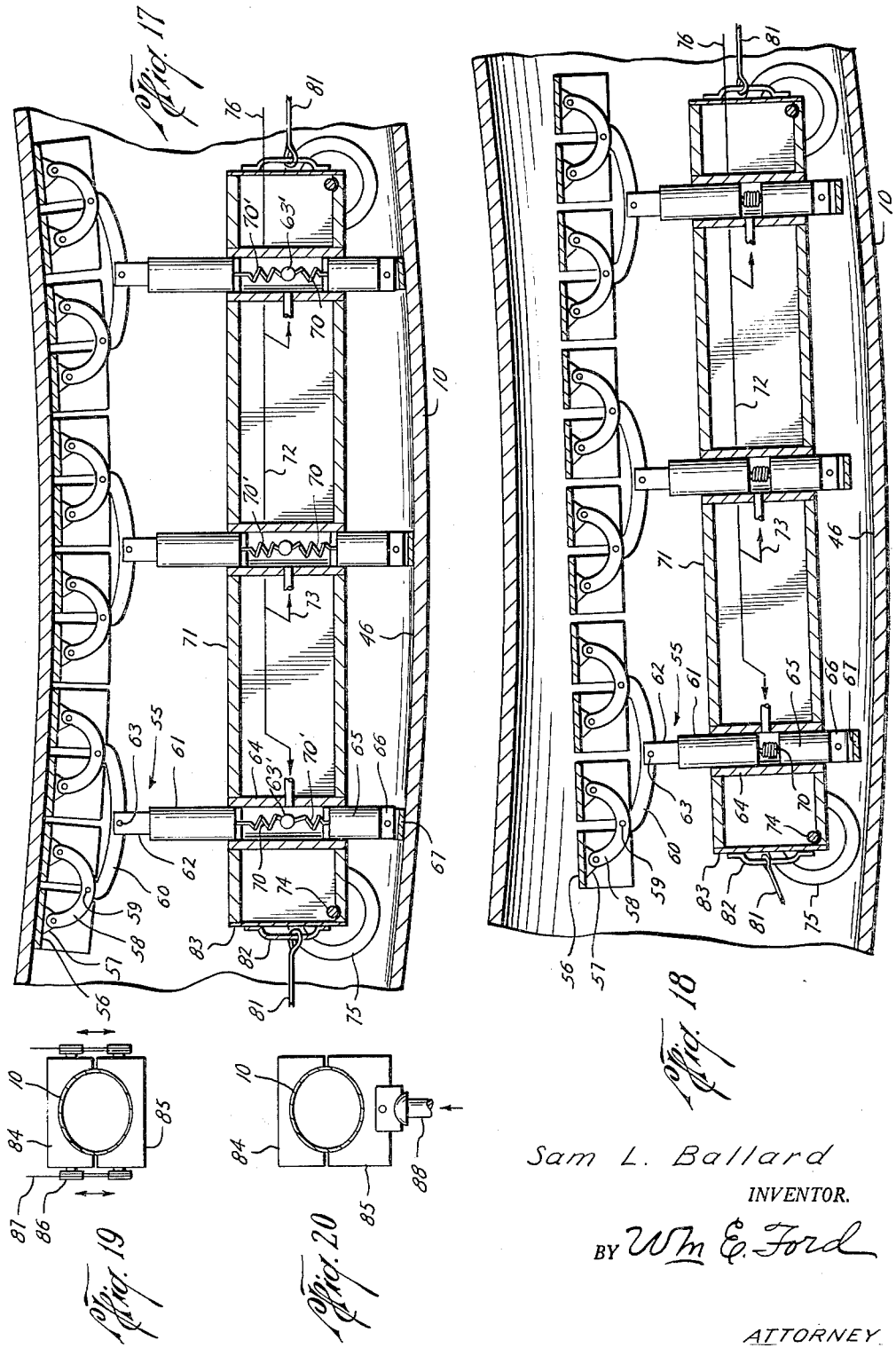

United States Patent Office 2,984,284
Patented May 16, 1961

2,984,284
FLEXIBLE MANDREL FOR USE IN COLD BENDING PIPE

Sam L. Ballard, 613 Memory Lane, Houston, Tex.

Filed Feb. 21, 1956, Ser. No. 566,866

2 Claims. (Cl. 153—63)

This invention relates to a method and apparatus for employment inside pipes to enable both large and small diameter pipes to be cold bent on relatively short radii without buckling or wrinkling on the inside of the bend to insure roundness of the internal periphery of the pipe in bending.

Heretofore pipe bending machines of all classes have either intentionally provided wrinkles on the inside of the bend as in the class termed "wrinkle benders," or else in those machines which have set out to avoid wrinkling or buckling nevertheless buckling or wrinkling has occurred on occasions as when the machines may have been operated too quickly and/or with the application of too much force, or when too great a leverage force has been applied to act through too great a distance and thereby achieve too great a bending moment or the opposite of the pipe from the bending die and spaced on the opposite side of the bending die from the holding shoe.

Also in pipe bending machines of all classes where the bending die is curved to fit the semi-periphery of the pipe and curved longitudinally in the shape of the bend, and in which the bending shoe is curved to fit the opposite semi-periphery of the pipe and is substantially straight longitudinally, in the course of bending the bending die and, to a greater extent the bending shoe, will be sprung sidewardly so that the pipe assumes an oval rather than a round cross-section when it is bent.

As pipe bending machines throughout the land, especially the larger types, are expensive and bulky, and as great expense would be involved in replacing the machines now operating with the defective results hereinabove described, if such could be rendered serviceable and operated in a manner to bend pipe at short radii without wrinkling and buckling and of acceptable roundness, a great need arises for any apparatus which may be employed with a wide range of the various pipe bending machines now in service to insure that pipe within the widest range of diameters may be thus bent on short radii without such wrinkling or buckling and in desired roundness of cross-section.

It is therefore a primary object of this invention to provide a method of cold bending pipe, and apparatus or devices employable therewith which are insertable in pipe to permit bending on shorter radii without wrinkling or buckling and to resist the tendency of the pipe to depart from roundness of cross-section during bending.

It is another object of this invention to provide a method of cold bending pipe, and apparatus or devices employable therewith which are contractible in diameter, and/or extendable in length for easy insertion into pipe prior to bending and for easy movement therein or withdrawal therefrom after bending.

It is also an object of this invention to provide a method of cold bending pipe, and apparatus or devices employable therewith in which the means supporting or positioning the internal pipe wall contacting elements in the bending position may remain connected thereto without impairment during bending so as to be employed again to move these elements after bending.

It is still a further object of this invention to provide a method of cold bending pipe, and apparatus or devices employable therewith in which the internal pipe wall contacting elements may be expanded to contacting position by pressure fluid means, mechanical means, or means inherent therein.

It is also another object of this invention to provide a method of cold bending pipe and apparatus or devices employable therewith internally of the pipe in conjunction with a wide variety of bending machines employed externally to bend the pipe.

Other and further objects will be apparent when this specification is considered in connection with the drawings in which:

Fig. 1 is a longitudinal sectional view showing one embodiment of the invention inserted in a straight pipe;

Fig. 2 is a longitudinal sectional view showing the embodiment of Fig. 1 in position in the pipe at the end of bending;

Fig. 3 is a longitudinal sectional view showing the embodiment of Fig. 1 being moved within the bent pipe after bending;

Fig. 4 is a sectional transverse view taken along line 4—4 of Fig. 1;

Fig. 5 is a longitudinal sectional view of a second embodiment of the invention shown in position in a pipe at the end of bending;

Fig. 6 is a transverse sectional view taken along line 6—6 of Fig. 5;

Fig. 7 is a fragmentary longitudinal sectional view of the linkage connections between loops, such linkage connections also being shown in Fig. 6;

Fig. 8 is a view of the linkage connections of Fig. 7 shown in extended position as at the end of bending;

Fig. 9 is an enlarged fragmentary sectional view of the pressure fluid operative elements shown in Figs. 5 and 6;

Fig. 10 is a longitudinal sectional view showing a third embodiment of the invention being drawn into position in a straight pipe;

Fig. 11 is a longitudinal sectional view showing the embodiment of Fig. 10 in position in the pipe just prior to bending;

Fig. 12 is a transverse sectional view taken along line 12—12 of Fig. 11;

Fig. 13 is a fragmentary sectional view of the linkage connections shown between adjacent spirals in Figs. 10 and 11;

Fig. 14 is a longitudinal sectional view of a fourth embodiment of the invention shown in position in a straight pipe at the beginning of bending;

Fig. 15 is a transverse sectional view taken along line 15—15 of Fig. 14;

Fig. 16 is a transverse sectional view showing the embodiment of Fig. 14 in retracted position and wheel supported for movement in a pipe either prior to or after bending.

Fig. 17 is a longitudinal sectional view showing the embodiment of Fig. 14 in position during, or just after bending.

Fig. 18 is a longitudinal sectional view showing the embodiment of Fig. 14 in retracted position and wheel supported for movement in the pipe after bending;

Fig. 19 is a transverse sectional view, partially diagrammatic, of one type of pipe bending machine in which the tendency to bend the pipe in oval cross-section is stressed;

Fig. 20 is a transverse sectional view, partially diagrammatic, showing another type of bending machine in which the tendency to bend the pipe in oval cross-section is stressed.

With reference to the drawings in which like reference numerals will be applied to like elements, a first embodiment of the invention is shown in Fig. 1 in which a straight pipe 10 receives therein a coil 11 comprised of stock of rectangular cross-section and under such formative compression that in the straight pipe the side surfaces of adjacent spirals abut each other, whereas the outer flat peripheral surfaces 14 of the spirals are in sliding contact tolerance with the inner wall 15 of the pipe. In order to insert the coil 11 into the pipe a rod 16 is provided which has a collar or flange 17 thereon and an end 18 extending inwardly from the flange 17. A ring or loop 19 is shown connected to the innermost spiral of the coil 11 and a similar ring 20 is shown connected to the outermost spiral thereof. The rod in assembly with the coil is installed so that the flange 17 is between the rings 19 and 20 and the rod extends outwardly through the outer ring 20. Thus when it is desirable to insert the coil 11 into a pipe, thrust is exerted on the rod 16 so that the flange 17 bears against the ring 19 and forces the spiral apart as friction retards the outermost spirals as they enter the pipe and thus the spirals from the innermost spiral, and successively outwardly contract out of contact with the pipe as they are spread, thereby permitting easy insertion of the coil 11 when positioned at the desired location in the pipe for bending. The thrust on the rod 16 is then discontinued and the spirals of the coils may thus contract to place the side surfaces thereof in sideward abutment. Prior to bending the rod 16 may be withdrawn until the outer surface of the collar 17 may substantially abut the outer ring 20, and the rod 16 may then retain or be held at this position as the bending takes place.

During bending, as is well known, any cylindrical section of pipe will undergo contraction on the inner part of the bend and expansion or stretch on the outer side of the bend and any element insertable in the pipe into frictional contact with the inner wall thereof will tend to respond accordingly. Thus the sideward surface 12 of adjacent spirals will be spread apart on the outer side of the bend as clearly shown in Fig. 2 in slightly exaggerated form. In this way since the spread is comparatively minute in dimension as compared with the length of pipe undergoing bending, there is still presented even to the outer part of the bent pipe a substantially cylindrical surface and thus a rigid element is presented to resist wrinkling of the pipe outwardly and a compact cylindrical surface is presented to resist wrinkling of the pipe on the inner part of the bend where such wrinkling ordinarily tends to take place. At the same time the outer surface of the spirals combine in forming a round device and the inner surface of the pipe wall is held in roundness. Especially since the surfaces of the coil on the inner part of the bend are pressed against the pipe wall with the side surfaces of adjacent spirals being pressed into tight sideward abutment, the tendency of the pipe to wrinkle or buckle on the inside of the bend is firmly and positively resisted with the consequence that pipe may be bent at shorter radii or alternately stated so as to give a greater degree of bend or greater subtended angle per running foot of bent pipe.

After bending is accomplished the coil 11 may be easily withdrawn or moved to a bending location as shown in Fig. 3 as all that is necessary is to exert an outward pull on the rod 16 so that a collar 17, pinned to the rod 16, urges outwardly against the ring 20 and the spirals are spread as they contract from the outermost coil and on successively inwardly until the innermost coil is drawn from out of full surface contact with the pipe and the coil slides along the pipe with only lower surface contact.

A second embodiment of the invention is shown in Figs. 5–9 in which a device 22 is shown comprising a series of loops 23 extending in longitudinal alignment in a pipe 10. Such loops are of rectangular cross-section stock and springs 24 are provided having their ends connected to rings 25 located in the end loops to the device, and such springs urge the adjacent loop side surfaces 12 into abutment when the device is inserted into a straight length of pipe. As shown in Figs. 6 and 9 the loops 23 are not continuous, but are interrupted over a small subtended angle, and have substantially radially inwardly extending flanges on the ends thereof.

A cylinder 27 having a closed end 28 and a flange 29 extending transversely therefrom has a piston 30 insertable thereinto through the other end thereof, and the outer end of the piston has a flange 31 extending transversely from the outer end thereof. A connection hook 32 connects the adjacent loop flange 26 with the piston flange 31 and holds such flanges in abutment, and correspondingly a connection hook 32 connects the adjacent loop flange 26 with the cylinder flange 29 and holds such flanges in abutment. A spring 33 has its ends connected to the connection hooks 32, and such spring in normally tending to return to its original compression draws the flanges 26 toward each other, and consequently urges the piston 30 into the cylinder 27.

An elbow 34 connects into the cylinder 27 adjacent its closed end 28 and supplies pressure fluid into said cylinder 27 from a header assembly 35 to urge said piston 30 outwardly as will be hereinafter described. The header 35 is comprised of connection T's or header blocks 36, one of which is mounted on a support block 37 connected to each cylinder 27. Flexible conduits 38 which are expansible, as rubber hose, interconnect the adjacent header blocks and a rigid inlet connection nipple 39 is connected to the outermost connection T 36 and is internally threaded to receive thereinto a pressure fluid conduit 40, and is externally threaded to have connected thereto a reducer fitting 41 to which is connected a handling tube or hollow rod 42. The conduit 40 extends for connection to the discharge side of a pump 44.

A reservoir 43 has the suction line of the pump 44 connected thereinto, and when a valve 45 in the fluid conduit 40 is opened fluid may be drawn from the reservoir 43 and delivered by the pump 44 into the conduit 40 and inlet connection 39 into the header 35 to deliver pressure fluid into the cylinders 27 to urge the pistons 30 outwardly to thereby urge the loops 23 outwardly and into engaging contact with the inner wall surface 46 of the pipe 10.

Prior to bending the handling rod 42 may be thrust upon to urge the device 22 into the pipe, and this force may be augmented by the attachment of a bridle 46a to the rings 25, and by the attachment of a rope or line 48 to the bridle 46 to be pulled upon to draw the device 22 into the pipe. Then, when the valve 44 is open while at the same time the pump 44 is not in operation, pressure fluid may be forced out of the cylinders 27 and back through the pump 44 to the reservoir 43 as the springs 33 urge the loop end flangers 26 toward each other responsive to the contraction of the springs 33 as the loops 23 are spread apart due to the longitudinal pull being exerted thereon. As a consequence the device 22 may be handled into the pipe with ease since the contraction of the loops under force of the springs 33 reduces them to smaller diameter so that upon entry into the pipe the loops may be more readily slid therein to the desired position while only maintaining contact with the pipe on the lowermost surface thereof.

When the device is in position the pump 44 is started and pressure fluid is delivered to the header 35 and cylinders 27 and the loops 23 are urged into contact with the inner surface of the pipe, as hereinabove described. Then the fluid valve 45 is closed and the loops 23 are fluid locked into position for bending.

The pipe is then bent by any type of pipe bending machine and during bending the side surfaces of the loops on the inner side of the bend are drawn into tight abutment, and thereby they strongly resist any tendency of the pipe to wrinkle or buckle irregardless of the small radius at which the pipe may be bent. On the other hand on the outer side of the bend the loops may spread apart as shown in slight exaggeration in Fig. 5. Thereby the stretch or increased arcuate length corresponding with the longer radius of the outside of the bend is accommodated, while at the same time the slight separation between loops is so inappreciable as to permit the device in its entirety to present a substantially cylindrical surface during bending.

After bending is completed the valve 45 may be opened and the pump 44 stopped and then the springs 33 may contract and force the pistons 30 inwardly in the cylinders 27 to force pressure fluid back out of the header assembly 35 and back into the reservoir 43. The loops may thus retract from surface contact with the inner surface of the pipe 10 and the device 22 is then in position to be moved out of the pipe or to a subsequent bending position by a pull on the tubular rod 42, or on the rope or line 47, or by a combination of these two means.

In order to maintain the adjacent loops connected within small limits of play, alternate chain links 47 are welded to each loop at positions adjacent the springs 24, as best shown in Fig. 6, so that when the sides 12 of the loops are in abutment the alternate links 47' extend with substantial side play or clearance around the welded links 47, which are shown in Fig. 7 in substantial abutment. However, when the loops are spread apart as on the outer part of the pipe bend the connecting links 47' assume the position shown in Fig. 8 and prevent the loops 23 from spreading too extensively. Thereby a permanent loose connection is made by means of these chain links to hold the elements of the device 22 in assembly during handling and in operation, and such is acomplished in an assuredly safeguarding fashion and extraneously of the functioning of the springs 24.

A third embodiment of the invention is shown in Figs. 10–13 in which elongated stock of channel cross-section is formed into a coil 50 and adjacent spirals 51 of the coil will rest in substantial sideward abutment under normal compression, as best shown in Fig. 11. The coil 50 is then inserted in a straight section of pipe 10 as shown in Fig. 11; rings 25' being affixed to the outer spirals at each end of the coil and ropes or lines 47' being connected to the ring on the inner end of the pipe to extend through the ring on the outer end of the pipe and then to extend back inwardly as shown in Fig. 11. Also a guide line 48 may be connected into the outer ring or rings 25' on the outer end of the coil. Thus a pull may be exerted on the inner lines 47' and guiding tension maintained on the outer line or lines 47', and thereby the coil 50 may be drawn and guided into a desired position in the pipe for bending.

A pair of radially spaced apart blocks 51 are provided in each spiral or convolution of the channel coil to fit between the channel flanges, and diametrically opposite such pair of blocks 51 another pair of blocks is provided in the same convolution and such blocks are arranged in longitudinal alignment as shown in Figs. 10 and 11. Countersunk head screws 52 extend through the web of the channel coil into the blocks and inwardly the ends of such screws make threaded connection into the ends of linkages 53. A linkage 53 having one end thus connected to a block 51 in one spiral of the channel coil, when such block 51 is in one line of blocks, will have its other end connected into a block 51 in an adjacent line of blocks and in an adjacent spiral. The blocks are so spaced apart on adjacent spirals that the spirals may achieve sideward abutment between adjacent spirals as substantially shown in Fig. 11, and such sideward abutment would assuredly occur if the line 48 on each end were released and the coil 50 could contract in length and expand in diameter as the initial compression in the coil returns it to condition under which it was formed to serve normally with the outer surfaces of the spirals being urged outwardly into pipe wall contact by coil expansion as the longitudinal pull is relieved from the coil.

Then, as bending proceeds, the sideward surfaces of adjacent spirals on the inside of the bend will be forced into closest abutment and thereby resist wrinkling and buckling of the pipe even when bending is done at short radii. On the other hand on the outer part of the bend the adjacent spirals may spread apart within the limits permitted by the linkages 53, and thus accommodate the coil to the stretch of the pipe as the outer part is bent at a greater radius than the inner part, while at the same time the linkages hold the coil together to present a substantially continuous, cylindrical surface to the inner surface of the pipe wall.

After bending, to move the coil 50 to a new location, or to move the coil out of straight pipe, as shown in Fig. 10, a pull may be exerted on the line 47' at one end of the coil while the lines 47' at the other end of the coil may be held taut as a guide and to abet in stretching the coil longitudinally to increase the angle at which the coils extend with relation to a plane through the pipe axis and normal to the plane of the paper in Figs. 10 and 11 resulting in the consequent retraction of the outer surface of the channel spirals from the surface of the pipe wall.

In the embodiment of the invention shown in Figs. 14–18 inclusive, a device 55 is provided which will permit a series of longitudinally aligned, arcuate shoes 56 to fit the pipe on the inside of the bend, as will be hereinbelow explained, while opposed thereto shorter arcuate seating shoes, in longitudinal, spaced apart alignment, seat upon the pipe interior surface on the outer part of the bend.

To this end each shoe 56 has a connection lug 57 on the inner side thereof, and an arcuate or substantially U-shaped toggle link 58 is pivotally connected at each end thereof to adjacent connection lugs to thereby toggle connect adjacent shoes when adjacent toggle links are in turn connected by a pivot pin 59 on the innermost or central part of each toggle link to the ends of a connection link 60. Each connection link 60 is then in turn pivotally connected to a piston 61 by means of its outer, bifurcated or forked end 62, which receives the connection link 60 between the bifurcations and provides a pivot pin 63 which extends from one bifurcation through the connection link 60 and into the other bifurcation and thus provides the pivot for such connection link.

A cylinder 64 is provided for each piston 61 to be received in one end thereof while an opposed piston 65 is received in the opposite end of the cylinder 64. Such pistons 65 are each provided with a bifurcated outer end 66. For employment on the opposite side of the pipe from the shoes 56 there is provided a seating shoe 67 which has a connection web 68 on the inner central part thereof so that when in a pipe the web will extend in a plane longitudinally thereof and between the bifurcations on the outer end 66 of the piston 65. Connection is made between the piston end 66 and a shoe 67 by means of a pivot pin 69 which extends from one bifurcation through the web 68 and into the other bifurcation to thus provide the pivot for the seating shoe 67. A spring 70 within each cylinder 64 is connected at its outer end to the inner end of the piston 61 and a spring 70' therein is connected at its outer end to the inner end of the piston 65. Inwardly of the cylinder 64 the inner ends of the springs 70, 70' are connected to a pin 63' extending across the cylinder 64 with its ends supported in the cylinder wall. As constructed the springs 70, 70' normally tend to draw the respective pistons 61, 65 inwardly toward the pin 63'.

A frame 71 supports each cylinder 64 and a header 72 is supported within the frame 71 to convey pressure fluid through inlet 73 into each cylinder 64 intermediate the pistons therein. The frame 71 has axles 74 extending transversely across the ends thereof on which are mounted wheels 75 to support the frame 71 when the pistons 61, 65 are in retracted position as will be hereinbelow described. A flexible conduit 76 connects the header 73 with a valve 77 which in turn is rigidly connected to the discharge of a pump 78. The suction line 79 from the pump 78 is connected to a reservoir 80 to draw fluid therefrom. When the springs 70 draw the pistons 61, 65 together so there is little pressure fluid in the cylinders 64, such fluid is forced back through the header 72 and flexible conduit 76 through the valve 77 when open, and through the pump 78, when stopped, and suction line 79 into the reservoir 80. In this position the wheels 75 support the frame 71 and the shoe assembly 55 carried thereby.

As supported by the wheels 75, the shoe assembly 55 is positioned in a straight pipe 10 to be bent, and rope or lines 81 tied to bars 82 attached to either end 83 of the frame 71 are handled to move the assembly into position in the straight pipe. Then the pump 78 is started up and pressure fluid is delivered therefrom to the header 72 and the individual cylinders 64 to urge the pistons 61, 65 outwardly to force the shoes 56, 67 into pipe wall contact, the wheels 75 thereby being lifted from the bottom of the inner surface of the pipe as shown in Fig. 14. The valve 77 is then closed.

The pipe is then bent, as shown in Fig. 17, and in bending the connection links 60 pivot on the piston ends 62, and thereby the shoes 56 conform to the curvature of the inside of the bend of the pipe, and accomplish this conformity while at the same time being enabled to move into close adjacency sidewardly, as the inside of the pipe contracts slightly in bending from its natural straight length. As normally the shoes 56 may be spaced apart sidewardly or longitudinally a predetermined distance calculated for the greatest contraction on the inner bend of the pipe which may be encountered in bending at the shortest radius contemplated, the shoes may be brought into closest sideward adjacency without interference with each other when such short radius bending is carried out.

After the pipe is bent, the valve 77 is opened and the springs 70 may then return to normal contraction within the cylinders 64 to draw the pistons 61, 65 inwardly to thereby retract the shoes 56, 67 from the inner surface 46 of the pipe 10 and transfer support to the wheels 75 as hereinabove described. Then, with the shoe assembly 55 thus supported the lines 81 may be handled to draw the assembly into a new position for bending or to withdraw the assembly from the pipe.

Figs. 19 and 20 show, in slight exaggeration, the departure from roundness which takes place in cold bending machines now employed. In Fig. 19 the pipe 10 is urged into a fixed die 84 formed transversely to receive the semi-periphery of the pipe, and curved longitudinally to receive the inner part of the bend of the pipe. A bending shoe 85, which is formed transversely to receive the other semi-periphery of the pipe, is straight longitudinally and is rolled about the pipe to bend it into the die 84. Pulleys 86 are mounted on the sides of the die 84 and shoe 85 and connecting cables 87 reeved through the sheaves of the pulleys to draw or "lace" the die and shoe together. Because of the cross-sectional configuration of the die 84 and shoe 85 in service under the extreme pressures exerted the die 84 and to a greater extent the shoe 85 tend to spread outwardly at the sides thereof, with the consequence that in time the pipe will tend to assume the oval cross-section shown in Fig. 19 if a means, such as one of the embodiments of this invention is not employed internally of the pipe to oppose this tendency to depart from roundness of the internal peripheral surface of the pipe. Machines of this type are exemplified by the machines disclosed in U.S. Patent No. 2,589,651, issued March 18, 1952, to Sam L. Ballard, for Pipe Bending Machine, Including Skid Lifting Device, in which the dies and shoes may be strengthened to the extent permissible within limitations imposed by the other requirements of the machine, but nevertheless, under service the tendency of the bent pipe to assume an oval cross-configuration cannot be wholly eliminated.

As shown in Fig. 20, machines constructed generally after the construction of Fig. 19 as to die 84 and shoe 85, but having as a force applying means a ram 88 which applies force at a point centrally spaced between the sides of the die 84 and shoe 85, and spaced 90° from the adjacent side surfaces of such members, such as disclosed in U.S. Patent No. 2,740,452, issued April 3, 1956, to John L. Coody, for Pipe Bending Machine, in which the bent pipe will tend to an even greater degree to spread apart, in absence of any side "lacing" means, and a more exaggerated oval cross-section is obtained with this type of machine. Thus in this type of machine, and to a much greater extent, there is needed one of the embodiments of this invention to be employed internally of the pipe to oppose the tendency of the pipe to depart from roundness of the internal peripheral surface during bending.

This invention sets out to provide apparatus and a method of bending which may be employed in the wide range of pipe bending machines now in the field from small hand operated devices to the largest machine operated benders as respectively applicable to the cold bending of very small to the largest diameters of pipe, and in every case of employment the invention in its various forms, will combat the tendency of the pipe to buckle or wrinkle, especially on the inner part of the bend, and will also oppose any force tending to cause the pipe to depart from internal roundness or peripheral surface as bent.

In the forms or embodiments disclosed, that shown in Figs. 1–4 is best adapted for employment in the bending of pipe of small diameters, those shown in Figs. 5–9 and in Figs. 10–13 are best adapted for employment in the bending of pipe of intermediate diameters, and that shown in Figs. 14–18 is best adapted for employment in the bending of pipe of large diameters, up to the largest encountered, where the diameters are of such dimensions and the pipe is of such strength as to require the employment of an embodiment of the invention of substantial size and strength capable of delivering excess bending force.

Broadly this invention includes a structure for and method of bending pipe in a manner to avoid wrinking or buckling and in a manner to maintain the pipe in roundness, and the invention is not limited to the exact method steps set forth nor to the structures of the embodiments disclosed, but other sequences and numbers of steps are included and other structures are included and such may fall within the broad spirit of the invention as to both method and structures, and as such may fall within the broad scope of interpretation claimed and merited for the appended claims.

What is claimed is:

1. A device for preventing wrinkling or buckling of pipe being bent including pipe being bent on short radii and for insuring internal roundness of cold bent pipe comprising a single, colorless series of arcuate metallic loops of rectangular cross-section stock, spring means connecting the end loops normally to hold said loops in sideward abutment, said loops being of interrupted circular shape and having a piston connected to one end and a piston cylinder to receive said piston and connected to the other end and spring means connected to urge said loop ends toward each other, header means including a connection to each cylinder and an extensible conduit between adjacent connections, and a substantially rigid inlet coduit connected to the outermost connection, interconnected linkage means between adjacent loops and being radially spaced from said cylinders and connecting said adjacent loops to limit maximum spread therebetween, pressure fluid control means in said inlet to admit pressure fluid into said header means to urge said pistons to force said loops into contact with the inner wall of the pipe to be bent to hold said pipe in internal roundness during bending, said loops maintaining sideward abutment on the inner side of the bend as the pipe is bent while said linkage means permits said loops to spread slightly apart on the outer side of the bend during bending, said pressure fluid control means then being reversible to permit said loop end connecting spring means to draw said loop ends toward each other and thereby force pressure fluid from said header whereby said loops are retracted from pipe wall bending contact and said support means with said loops thereon may be moved in said pipe.

2. A device for preventing wrinkling or buckling of pipe being cold bent including pipe to be cold bent on short radii and for insuring internal roundness of cold bent pipe comprising a single, coreless series of arcuate metallic loops of interrupted circular shape and of rectangular cross-section, in sideward abutment and conjoining in presenting axially extending flat surface contact to the internal periphery of the pipe during bending and resilient means to draw said loops into close adjacency on the inside of the bend of the pipe during bending and to permit said loops to spread slightly apart on the outside of the bend during bending, and means supporting said sections for insertion into the pipe including hydraulic means to expand the loops firmly against the pipe and reversible to permit the retraction of said loops from pipe bending contact to permit movement therein after bending.

References Cited in the file of this patent

UNITED STATES PATENTS

| | | |
|---|---|---|
| 166,294 | Orum | Aug. 3, 1875 |
| 179,130 | Orum | June 27, 1876 |
| 538,555 | Smith | Apr. 30, 1895 |
| 1,105,914 | Miller | Aug. 4, 1914 |
| 1,534,314 | Heintz | Apr. 21, 1925 |
| 1,937,663 | Norton | Dec. 5, 1933 |
| 2,401,052 | Cummings | May 28, 1946 |

FOREIGN PATENTS

| | | |
|---|---|---|
| 716,996 | Germany | Feb. 3, 1942 |